United States Patent [19]
Sullivan

[11] 3,762,107
[45] Oct. 2, 1973

[54] METHOD FOR MACHINING RINGS

[75] Inventor: Edward F. Sullivan, Saginaw, Mich.

[73] Assignee: B & K Tool & Die Corporation, Saginaw, Mich.

[22] Filed: Mar. 13, 1972

[21] Appl. No.: 234,225

Related U.S. Application Data

[62] Division of Ser. No. 26,027, April 6, 1970, Pat. No. 3,660,945.

[52] U.S. Cl. .................................................. 51/290
[51] Int. Cl. ............................................. B24b 1/00
[58] Field of Search .............................. 51/290, 324

[56] References Cited
UNITED STATES PATENTS

| | | | |
|---|---|---|---|
| 3,296,747 | 1/1967 | Philippsen | 51/290 X |
| 3,137,019 | 6/1964 | Bornefeld | 51/290 X |
| 2,385,979 | 10/1945 | Flora | 51/290 X |
| 2,929,174 | 3/1960 | Aumiller | 51/290 X |
| 2,422,418 | 6/1947 | Hutto | 51/73 R X |

Primary Examiner—Donald G. Kelly
Attorney—Learman & McCulloch

[57] ABSTRACT

Method for honing or lapping ring-shaped piston rings, having a gap therein, including the steps of individually stripping rings from a stack of rings and feeding them individually through a cylindrically shaped lapping drum along the horizontal axis thereof while simultaneously relatively rotating the drum and workpiece. In one version of the method, as the rings are passing through the drum, the drum is oscillated slightly about a vertically extending axis. After the rings are moved through the cylindrically shaped lapping drum, they are discharged.

11 Claims, 9 Drawing Figures

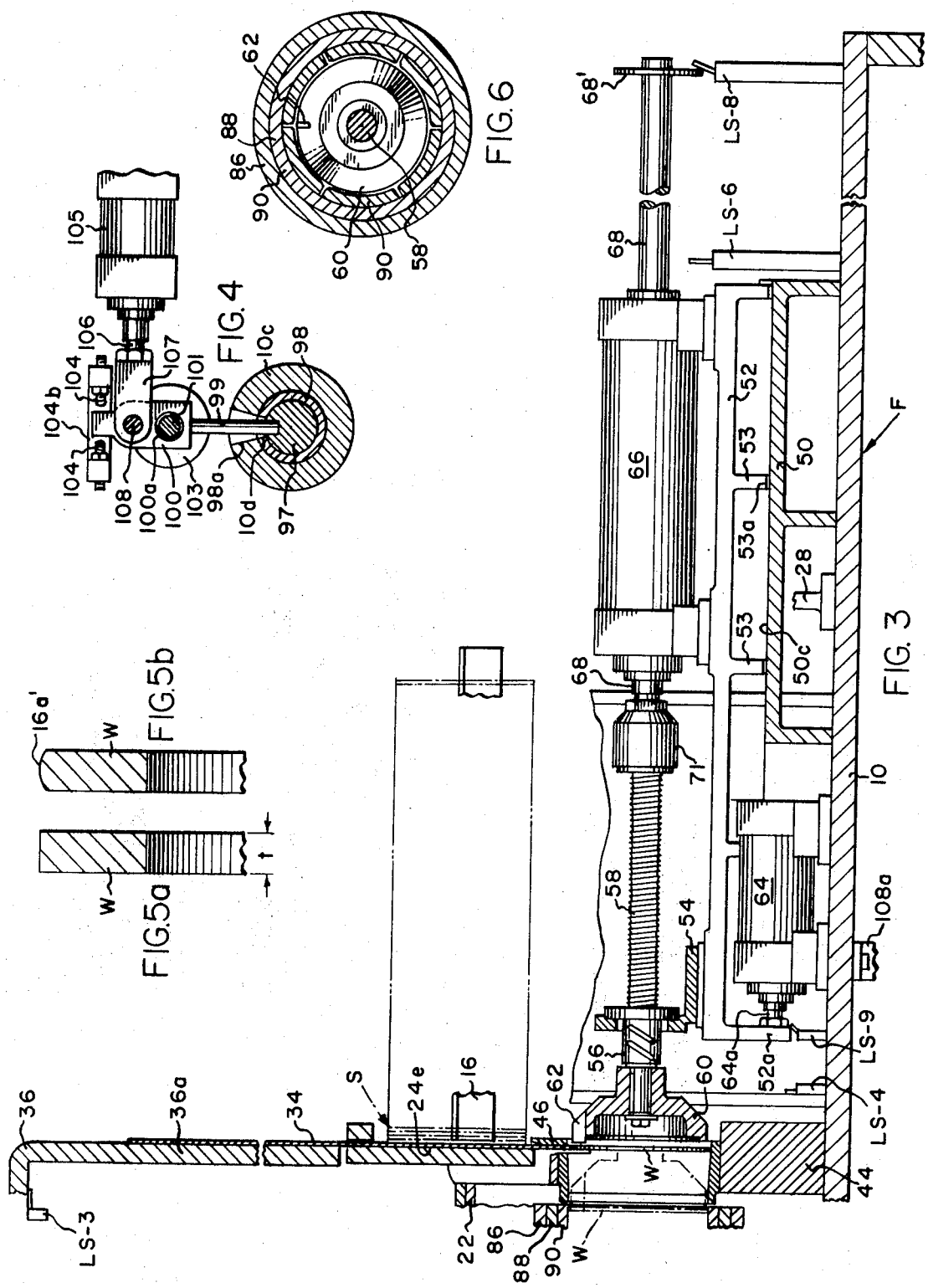

3,762,107

METHOD FOR MACHINING RINGS

This is a division of application Ser. No. 26,027, filed in the U.S. Pat. Office on Apr. 6, 1970, now U.S. Pat. No. 3,660,945, granted May 9, 1972.

This invention relates to methods of individually machining piston rings having a gap therein. In one aspect thereof, this invention relates to methods of individually machining a piston ring having an outer peripheral surface which is curvilinear between the ends of the ring.

Piston ring machining apparatus has been provided in the past, however, operation of this apparatus is dependent upon extensive manual handling of the rings both before the machining operation, to properly position the rings on a multiple ring carrier, and after machining operation, to remove the rings therefrom.

Piston rings of uniform external diameter are well-known and so are machines for simultaneously machining a stack of such rings. However, other piston rings must be barrel-shaped, in which case the axial end portions of the rings are formed with a reduced diameter so that the outer peripheral surface between the ends of the ring is curvilinear. The known prior are machines of this character do not lend themselves to the machining of barrel type rings.

According to the present invention, therefore, it is an object of the present invention to provide a method of automatically loading individual rings and moving them individually through a machining station, prior to automatically discharging the rings after they have been machined.

Another object of the present invention is to provide a method of machining barrel-shape piston rings.

Yet another object of the present invention is to provide a method of moving piston rings through a machining cylinder along a longitudinal axis while simultaneously oscillating the machining cylinder about a transverse axis.

A further object of the present invention is to provide a method of machining a ring-shaped piston ring having a gap therein by rotating a machining cylinder in one direction and simultaneously individually rotating the piston rings in an opposite direction.

A still further object of the present invention is to provide a method of individually stripping a ring-shaped piston ring, having a gap therein, from a stack of such rings, individually feeding the rings to an actuating plunger which moves the ring through an oscillating machining drum, and discharging the machined workpieces at the opposite end of the machining drum.

Other objects and advantages of the present invention will become apparent to those of ordinary skill in the art by the following description which when considered in relation to the accompanying drawing of which:

FIG. 3 is an enlarged fragmentary, sectional side elevational view illustrating a ring feeding mechanism in an axially rearward position and a ring supplying guillotine member in a vertically lowered position, an axially adjusted position of the ring feeding mechanism being shown in chain lines;

FIG. 4 is a slightly reduced, fragmentary top plan section view of a mechanism for oscillating the machining drum, taken along the line 4 — 4 of FIG. 1;

FIGS. 5a and 5b are fragmentary sectional views taken through a typical "flat" type ring and "barrel" type ring, respectively;

FIG. 6 is an enlarged fragmentary vertical sectional view through the machining cylinder, taken along the line 6 — 6 of FIG. 1;

FIG. 7 is a front elevational view of a typical "flat" type workpiece which may be machined by the apparatus illustrated in FIGS. 1 - 4 and 6.

THE GENERAL SYSTEM

Figure 1:
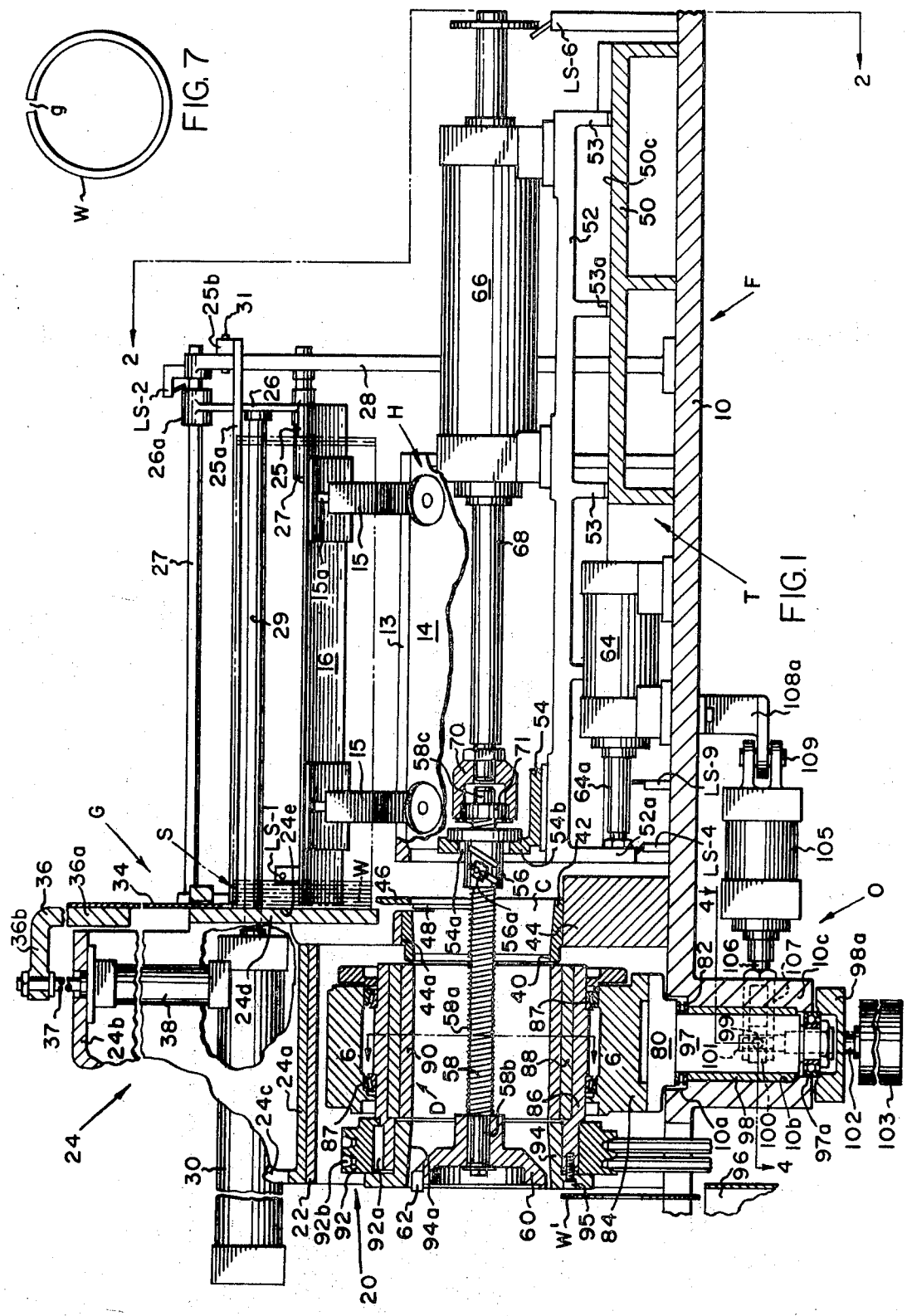
FIG. 1 is a partly sectional, side elevational view of workpiece machining apparatus utilized to carry out the method of the present invention and including a workpiece feeding mechanism illustrated in a workpiece discharge position, parts of the apparatus being broken away to more clearly illustrate portions thereof.

Referring now more particularly to the drawings, apparatus used in carrying out the method of the invention generally includes a guillotine stripping mechanism, generally designated G, for successively individually stripping an endmost workpiece W from a stack S of such workpieces and transferring it individually to a closing sleeve C. Transfer apparatus, shown generally at T, is provided for individually moving the workpieces W in a single pass through a lapping or housing station formed by a honing or lapping cylinder, indicated generally at D, and discharging the machined workpiece W' on the other side of the lapping cylinder. An oscillating mechanism, generally designated O, is also provided in the machine illustrated for oscillating the lapping cylinder D as barrel-shaped rings are individually passed therethrough to machine the outer peripheral curvilinear surface of the workpieces in a manner to be described more fully hereinafter. The barrel shaped ring (FIG. 5b) is generally similar to the flat ring (FIG. 5a) but includes an outer surface 16a' which is curvilinear between its ends.

THE STACK SUPPORTING MECHANISM

Apparatus used in carrying out the method of the invention is mounted on a frame, generally designated F, which includes a top wall 10 spanning a pair of side walls 12. Mounted atop the frame F is a housing H, including a pair of side walls 14 supported on the wall 10 and a top wall 13 spanning the side walls 14.

Mounted on the housing H are two longitudinally extending, vertically inclined, stack supporting plates 16 forming a V-shaped way for supporting a stack S. The plates are supported for adjusting movement on the terminal T-shaped ends of members 15a which are slidably received within housings 15 mounted on the upper portion of the opposite side walls 14 on blocks 17. The members 15a are adjustable within the housings 15 by means of adjustment screws 15b threadedly received by members such as nuts (not shown) in the housing 15.

THE STRIPPING MECHANISM

On the left side of the frame F, as viewed in FIG. 1, another housing, generally designated 20 is provided to house the machining drum D and includes side walls 21 supported on the wall 10, and an upper support wall portion 22 spanning the walls 21. A housing 24 is mounted atop the housing 20 and includes a bottom wall 24a, a top wall 24b, an inclined rear wall 24c and a partial front wall 24d. The stack S of workpieces W is urged toward the outer face 24e of the wall 24d by a generally horizontally disposed pusher bar 25 (FIG. 2) connected at one end with a bracket 26 having slide bearings 26a slidably mounted on a pair of vertically spaced rods 27. The opposite ends of the rods 27 are secured by the housing 24 and a vertically extending bracket 28 mounted on the wall 10. The bracket 26, mounting the pusher 25, is connected with the piston rod 29 of a pneumatic cylinder 30 which continually maintains a substantially constant pressure on the piston 29, urging the bracket 26 and the pusher member 25 toward the left as viewed in FIG. 1 in such manner as to releasably clamp the endmost workpiece W of the stack S against the face 24e of the plate 24d.

Each of the piston rings W (FIG. 7) is provided with a gap g. When a stack S is positioned on the support plates 16, the gaps g of each of the piston rings W in the stack S are longitudinally aligned so as to receive a longitudinally extending, guide bar 25a connected at one end with a rod 25b which is pivotally mounted on a pivot pin 31 fixed to the bracket 28. The gap of a typical piston ring W, having a radial wall thickness of approximately 0.190 inches and an outside diameter of 3.875 inches, may be 0.010 – 0.020 inches wide. The ends of the bar 25a and support plates 16 adjacent the face 24e of the wall 24d are spaced from the end face 24e a distance slightly greater than the thickness $t$ (FIG. 5a) of one ring W, but slightly less than the thickness of two rings, to permit a workpiece W to pass therebetween when the guillotine G is moved downwardly. The rod 25b is biased to the position shown in FIG. 2 against a stop pin 32b on the bracket 28 by a spring 32 connected between the bracket 28 and the rod 25b. The rod 25b may be quickly swung upwardly when a new stack S is to be positioned on the plates 16.

THE GUILLOTINE MECHANISM

For individually removing the workpieces W from the stack S supported on the plates 16, the guillotine G comprises a thin flat plate 34, having a thickness at least no greater than the thickness $t$ of a piston ring W, which is bolted or otherwise suitably secured to one leg 36a of an L-shaped bracket 36. The bracket 36 and plate 34 are vertically movable from the position shown in FIG. 1 to the position shown in FIG. 2 by a piston rod 37, which is connected to the other leg 36b of the bracket 36 and operated by a double-acting solenoid operated hydraulic or pneumatic cylinder 38 which is secured to the under side of the upper wall 24b of the housing 24. The free terminal end portion of the plate 34 is formed with a curvilinear recess 34a (FIG. 2) which generally conforms to the outer cylindrical configuration of the workpiece W.

As the plate 34 is moved downwardly, the endmost workpiece W is moved downwardly and is guided by an enlarged guide portion 46, forming the end of the closing sleeve C, into a semi circular slot 48 formed in the upper half of the sleeve C adjacent the guide member 46. The sleeve C includes a portion 42 forming a passage having a uniformly tapered internal diameter and a portion 40, at its other end, forming a passage of substantially constant diameter. The sleeve C is secured within an aperture 44a provided in a support 44 mounted on the wall 10. As the plate 34 of the guillotine G moves a workpiece W downwardly, it is guided by the guide 46 into the slot 48 until the workpiece W rests in the closing sleeve C in the full line position shown in FIG. 3. The guillotine G is then returned to the position shown in FIG. 1.

TRANSFER APPARATUS

The transfer apparatus T, for moving the workpieces W axially through the tapered bore of the closing sleeve C and through the machining drum D, includes a lower guide member 50 fixedly secured to the upper surface of the wall 10. A longitudinally extending recess 50a is formed in the upper surface of the guide 50 for slidably receiving the rear portion of a longitudinally movable slide 52 which has a plurality of parallel, spaced apart supporting walls 53 formed with hardened runner portions 53a, along the lower surfaces thereof, which ride on the surface 50c of the recess 50a. At its front end, the slide 52 mounts an L-shaped bracket 54 having an aperture 54a in the vertically extending leg 54b thereof. A recirculating ball-type nut 56 such as disclosed in U.S. Pat. No. 3,124,969 is welded or otherwise suitably fixed to the leg 54b, is received within the recess 54a, and includes a plurality of recirculating balls 56a received within the grooves 58a of a screw 58 in the normal manner.

The front end 58b of the screw 58 is keyed to a workpiece positioning ring 60 having a radially extending positioning fin 62 extending slightly axially forwardly of the ring 60 at the outer peripheral edge thereof. The width of the fin 62 is slightly less than the width of the gap g in a piston ring to be machined, so as to be receivable therein when the positioning ring 60 is moved axially toward the left from its position shown in FIG. 3. When the workpiece W is moved downwardly from the stack S to the closing sleeve C, it is slid downwardly without being rotated so the relative angular position of the gap g does not change during this downward movement. Thus, the gap g will be positioned directly above the axis of the lapping screw 58 when the ring is received in sleeve C. As shown in the drawing, the fin 62 is located above the axis of the screw 58 and in axial alignment with the gap g of the workpiece positioned in the closing sleeve C.

To move the fin 62 into the gap g of a workpiece W positioned in the closing ring C, a slide cylinder 64 is fixed on the top wall 10 and includes a piston 64a connected with a lug 52a depending from the forward portion of the slide 52. After the cylinder 64 has moved the positioning fin 62 into the gap g, it will continue to move the ring 62 and workpiece W from the full line position shown in FIG. 3 to the chain line position shown in FIG. 3 to constrict the workpiece W so as to cause the gap g to close tightly around the positioning fin 62 as the workpiece is moved into the portion 40 of the closing sleeve C.

To move a workpiece W from the chain line position shown in FIG. 3 through the lapping drum D to the position shown in FIG. 1, a double-acting solenoid operated pusher cylinder 66 is mounted atop the slide 52 and includes a piston rod 68 mounting a cup-shaped bearing bracket 70 at its terminal end. The end 58c of the screw 58 is journaled in a bearing 71 secured within the bearing bracket 70. As the piston rod 68 is moved forwardly from the dotted line position shown in FIG. 3, the screw 58 will be rotated by the recirculating ball nut 56 and thus will rotate the workpiece W as it axially drives it through the lapping drum D.

THE LAPPING DRUM

Apparatus for supporting the lapping drum D includes a turntable 80 rotatably supported on bearings 82 provided in a recess 10a of the housing 10. A drum housing 84 is fixed to the turntable 80 and journals an annular driving sleeve 86 therein by means of roller bearings 87. Removably mounted in a holder sleeve 88 provided within the sleeve 86 is a plurality of interchangeable cast iron lapping, hone, or external abrading members 90 (FIG. 6). The drum D, including the members 90, is rotated by means of a belt 92b which is driven by a motor M-1 (FIG. 8) and trained around a pulley 92 fixed to the forward end of the sleeve 86 by a key 92a.

An expander sleeve 94 is secured to the sleeve 86 by suitable bolts 95 and includes a tapered bore 94a which diverges outwardly to permit a machined workpiece W' to gradually expand as it is removed axially from the lapping drum D, so that the gap g gradually enlarges slightly relative to the positioning fin 62. When the machined workpiece W' clears the forward end of the expanding ring 94a, it is released and removed from the fin 62 to be received within a chute 96. If the rings W are of the flat type as shown in FIG. 5a, they are moved through the drum D without the drum D being oscillated.

THE BARREL OSCILLATING MECHANISM

If, however, barrel-shaped rings, as shown in FIG. 5b, are to be lapped, the oscillating mechanism O is operated. The oscillating mechanism O is connected with a shaft 97 which is fixed to the underside of the turntable 80 and is rotatably received within a bearing sleeve 98 secured within a bore 10b formed in a downwardly extending housing extension 10c. The lower end of the shaft 97 is journaled in a set of bearings 97a secured in the housing 10c in the normal manner. A bearing cap 98a for the assembly may be connected with the end of the housing 10c in any suitable manner such as bolts (not shown).

A drive rod 99 (FIG. 4) is fixed at one end to the shaft 97 and extends horizontally through apertures 98a and 10d formed in sleeves 98 and 10c respectively. The other end of the rod 99 is fixed to a rocking plate 100 which oscillates the shaft 97, and is movable between the fixed stops 104 mounted on a plate 104b by means of a single-acting, solenoid actuated, spring returned cylinder 105. The piston 106 of the cylinder 105 is connected to a bracket 107 pivotally connected with the bracket 100 by means of a pin 108. The cylinder 105 is pivotally connected with a bracket 108a on the housing 10 by means of a pin 109 as shown.

If flat rings are to be machined, the oscillating mechanism may be locked in a fixed position to prevent its oscillation. For this purpose, a removable locking pin 101 is fixed to the piston 102 of a double-acting solenoid actuated pneumatic cylinder 103 and is receivable in an aperture 100a formed in the plate 100.

THE CONTROL CIRCUIT

Figure 8:
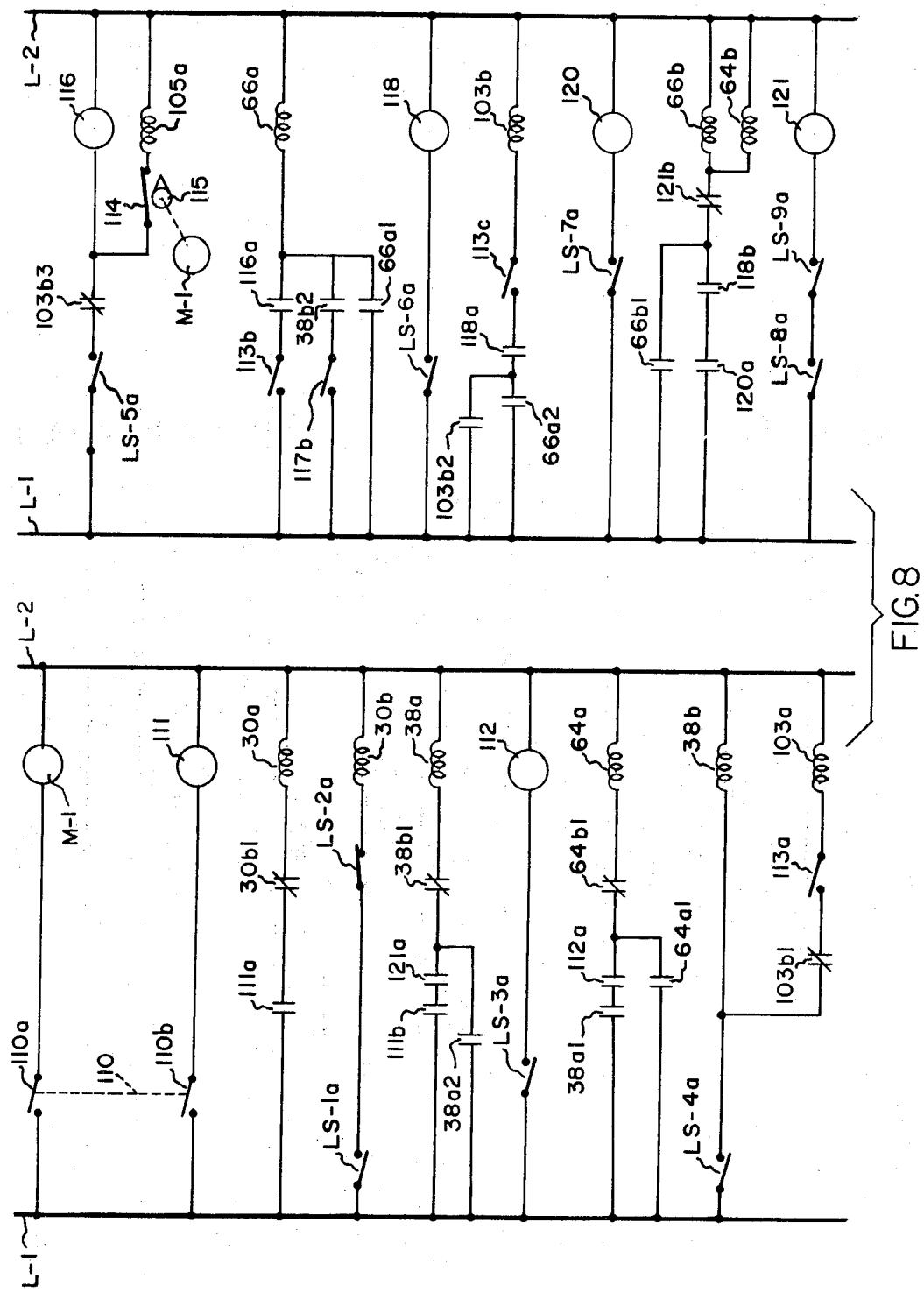
FIG. 8 is a schematic diagram of a typical electrical control circuit which is used in controlling the apparatus illustrated in FIGS. 1 - 4 and 6.

Referring now to FIG. 8, a schematic diagram of a typical electrical control circuit is illustrated and includes a pair of lines L-1 and L-2 connected across a suitable source of power such as 110 V, 60 cycle A.C. The start winding for the machining drum driving Motor M-1 is connected in series across the line with the contacts 110a of a start switch 110, and a holding relay 111 is connected in series across the line L-1 and L-2 with the contacts 110b of the start switch 110. The relay 111 includes sets of normally open contacts 111a and 111b which are closed when the relay 111 is energized. For directing pneumatic pressure to the cylinder 30, in a manner to move the piston 29 forwardly toward the left, and return toward the right, the usual valve actuating solenoids 30a and 30b, respectively, are provided. A pair of normally closed contacts, associated with the retract solenoid 30b, are shown at 30b1 connected in series with the advance solenoid 30a and the normally open contacts 111a of the relay 111. A limit switch LS-2, mounted on the bracket 28 in the path of bracket 26, includes a set of normally closed contacts LS-2a which are opened when the stack pusher 25 is moved to a position for receiving a new stack S as shown in FIG. 1. At the front of a stack S, mounted on the plates 16, is a limit switch LS-1 which includes sets of normally open contacts LS-1a and normally closed contacts LS-1b which are closed and opened respectively when the stack pusher 25 is moved to the forward position. The normally open contacts LS-1a and the normally closed contacts LS-2a are connected in series with the return solenoid 30b of stack advancing cylinder 30 across the lines L-1 and L-2. The solenoids for lowering and raising the guillotine blade 34 are shown at 38a and 38b respectively. The advance solenoid 38a includes sets of normally open contacts 38a1 and 38a2 which are closed when the solenoid 38a is energized. The retract solenoid 38b includes a set of normally closed contacts 38b1.

A limit switch LS-8 is mounted on the rear portion of the top wall 10 and is engageable by the switch actuator 68' when the piston 68 of cylinder 66 is in its rearmost position to close the normally open contacts LS-8a. A limit switch LS-9 is mounted on the top plate 10 and is actuable when the slide 52 moves rearwardly to the postion shown in FIG. 1 to close the normally open contacts LS-9a. The contacts LS-8a and LS-9a are connected in series across the lines L-1 and L-2, with a relay 121, which includes a set of normally open contacts 121a which are closed when the relay 121 is energized. The normally open contacts 121a are connected in series circuit relation with the normally open contacts 111b, the normally closed contacts 38b1, and the guillotine lowering solenoid 38a.

The limit switch LS-3 (FIG. 3) is suitably mounted on apparatus (not shown) and is actuated when the guillotine is in the lowermost position to close the normally open contacts LS-3a which are connected in series circuit with a relay 112 having a set of normally open contacts 112a which close when the relay 112 is energized. The normally open contacts 38a2 of the solenoid 38a are connected in parallel with the contacts 111b and 121a.

The double-acting, solenoid operated slide operating cylinder 64 is movable forwardly and rearwardly when the solenoids 64a and 64b are actuated respectively. The solenoid 64a and the solenoid 64b include sets of normally open contacts 64a1 and normally closed contacts 64b1, respectively, which are closed and opened respectively when the solenoids 64a and 64b are energized. The solenoid 64a is connected in series circuit relation across the lines L-1 and L-2 with the set of normally closed contacts 64b1, the set of normally open contacts 112a, and the normally open set of contacts 38a1. The solenoid 64a, when energized, closes a set of normally open holding contacts 64a1 connected between the junction of the contacts 112a and 64b1 and the line L-1.

A limit switch LS-4 is mounted on the top plate 10 and is actuated when the slide 52 is moved forwardly to close the normally open contacts LS-4a connected in series circuit relation with the guillotine return solenoid 38b.

Figure 2:
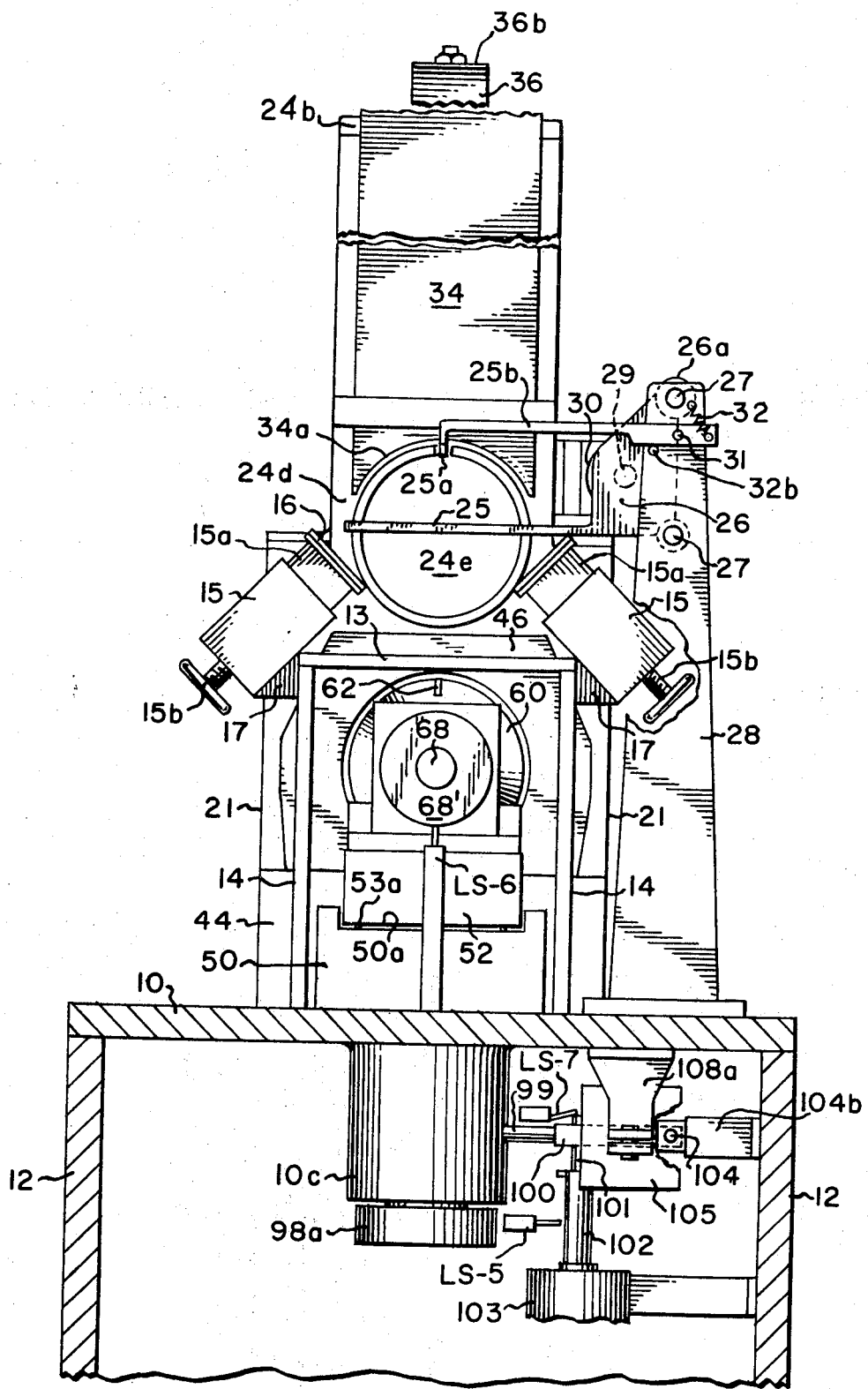
FIG. 2 is a partly sectional end elevational view taken along the line 2 — 2 of FIG. 1.

To actuate the cylinder 103 so as to retract the shot pin 101 from the bore 100a and to return the pin 101 into the bore 100a, a pair of solenoids 103a and 103b are provided. The solenoid 103b, when energized, opens sets of normally closed contacts 103b1 and 103b3, and closes a set of normally open contacts 103b2. A switch 113, including sets of normally open ganged contacts 113a, 113b and 113c, is actuated when it is desired to oscillate the drum D about the axis of the shaft 97 so as to machine the barrel-shaped rings illustrated in FIG. 5b. The switch contacts 113a are connected in series with the solenoid 103a and the normally closed contacts 103b1 across the line L-2 and the junction of contacts LS-4a and the solenoid 38b. A limit switch LS-5a, shown in FIG. 2, is actuated when the shot pin 101 is retracted to close the normally open contacts LS-5a which are connected in series circuit relation with the normally closed contacts 103b3 of the relay 103b and a relay 116, which when energized, closes a normally open set of contacts 116a.

The solenoid for actuating the cylinder 105 to move the piston associated therewith forwardly to oscillate the lapping cylinder D is shown at 105a. A cam operated, spring closed switch 114 is connected in series circuit therewith between the lines L-2 and the junction of contacts 103b3 and the solenoid 116. A timing cam 115, driven by the motor M-1, periodically opens the switch 114 as required, depending upon the particular machining operation to be performed. For example, as a workpiece W passes through the lapping drum, the switch 114 will be opened and closed 15 times. The solenoids for actuating the pusher cylinder 66 to move the piston associated therewith forwardly and rearwardly are shown at 66a and 66b respectively. The solenoid 66a is connected in series circuit relation with the normally open contacts 116a and the normally open contacts 113b. As previously mentioned, the normally open contacts 113b of the switch 113 are closed when it is desired to place the machine in the oscillatory condition for machining the barrel-shaped rings shown in FIG. 5b. If the straight or flat rings shown in FIG. 5a are to be machined, the switch contacts 117b are closed. The switch contacts 117b are connected in series circuit relation with the normally open contacts 38b2 between the lines L-1 and the junction of contacts 116a and 66a. The solenoid 66a, when energized, closes a set of holding contacts 66a1 which are connected in parallel with the contacts 117b and 38b2.

When the pusher cylinder piston rod 68 is in the forward position shown in FIG. 1, the switch actuator 68' actuates the limit switch LS-6, mounted on the top wall 10, to close the normally open contacts LS-6a connected in series circuit with a relay 118, which, when energized, closes sets of normally open contacts 118a and 118b. The solenoid 103b for raising the shot pin 101 is connected in series circuit relation across the lines L-1 and L-2 with the contacts 113c, the normally open contacts 118a, which are closed when the solenoid 118 is energized, and the normally open contacts 66a2 which are closed when the solenoid 66a is energized to move the ring holder 60 forwardly. A set of normally open holding contacts 103b2 are connected in parallel with the contact 66a2 and are closed when the solenoid 103b is energized.

A limit switch LS-7 is actuated when the pin 101 is moved into the aperture 100a by the cylinder 103 and closes the normally open contacts LS-7a which are connected in series circuit relation with a relay 120, which, when closed, closes the normally open contacts 120a associated therewith. The normally open contacts 120a, the normally open contacts 118b, and the normally closed contacts 121b are connected in series with the parallel circuit comprising the pusher retract solenoid 66b and the slide retract solenoid 64b. The normally open holding contacts 66b1 which are closed when the solenoid 66b is energized is connected in parallel with the contacts 120a and 118b. Typically, when the lapping drum D is being rotated at the rate of 65 – 300 revolutions per minute, workpieces four inches in diameter may be fed through the drum D at the rate of 1.13 feet to 5.25 feet per second.

THE OPERATION

If barrel-shaped rings, as shown in FIG. 5b, are to be lapped, the switch 113 is manually actuated to close the switch contacts 113a, 113b, and 113c and the switch contacts 117b remain open. It will be assumed that the positioning fin 62 is initially in the rearward position shown in FIG. 3 and that the slide 34 is in the raised position as shown in FIG. 1. When the start switch 110 is closed to close the contacts 110a and 110b, the motor M-1 drives the drum D to rotate the cast iron members 90 in one direction. The relay 111 closes the contacts 111a to energize the solenoid 30a and move the stack pusher 25 forwardly to bias the stack S against the face 24e of the housing 24. With the pusher cylinder piston 68 and slide cylinder piston 64a in the rearward position shown in FIG. 3, the contacts LS-9a and LS-8a of limit switches LS-9 and LS-8 will be closed to actuate the solenoid 121 and the guillotine lowering solenoid 38a will be actuated to move the guillotine blade 34 downwardly to strip the endmost workpiece W from the stack S and move it downwardly where it is guided by the guide 46 into the slot 48 of the closing sleeve C. The slot 48 is cut approximately half-way through the sleeve C so that the guillotine blade 48 moves approximately half-way through the closing sleeve C. As the guillotine reaches its lowermost position and the workpiece W is positioned in the closing sleeve C, the limit switch contacts LS-3a close to actuate the relay 112 whereby the contacts 112a close to actuate the slide solenoid 64 a and move the slide 52 forwardly from the full line position, shown in FIG. 3, to the chain line position inside the lapping drum D, also shown in FIG. 3, so that the positioning fin 62 is received within the gap g of the workpiece in the closing sleeve and the workpiece W is moved axially in the tapered bore portion 42 toward one side of the abrading member 90 to constrict the workpiece and close the gap around the positioning fin 62. When the slide 52 is moved forwardly, the limit switch LS-4 is actuated to close the contacts LS-4a and energize, the guillotine retract solenoid 38b to move the guillotine blade 38 from the position shown in FIG. 3 to the raised position shown in FIG. 1. Simultaneously, since barrel-shaped rings are to be machined, the pin 101 is retracted by the energization of the solenoid 103a. When the shot pin 101 is retracted, the contacts LS-5a are closed to actuate the solenoid 105a to oscillate the drum D about the axis of the shaft 97 as the switch 114 is alternately opened and closed. As the timing cam 115 opens the contacts 114, the piston 106a of the cylinder 105 is spring returned, and when the contacts 114 again close, the plunger 106a will again move forwardly.

With the switch 113b closed, and the relay 116 energized to close the normally open contacts 116a, the solenoid 66a is energized to move the pusher ring 60 forwardly from the dotted line position shown in FIG. 3 to the full line position shown in FIG. 1. The nut 56 simultaneously rotates the pusher ring 60 about its longitudinal axis in a direction opposite to the direction of rotation of the drive D. When the ring holder 60 has pushed the workpiece W' beyond the expanding ring 94, the workpiece W' passes downwardly to the discharge chute 96 and the switch actuator 68' engages the limit switch LS-6 to close the contacts LS-6a and energize the solenoid 118 which closes the contacts 118a to energize the solenoid 103b and raise the pin 101 into the aperture 100a to lock the bracket 100 and prevent its oscillation on the return portion of the stroke. When the pin is in the aperture 100a, the limit switch LS-7 is actuated to close the normally open contacts LS-7a which actuates the relay 120 closing the contacts 120a which energizes the pusher retract solenoid 66b and the slide retract solenoid 64b to move the pusher ring 60 rearwardly and the slide 52 rearwardly until they return to the position shown in FIG. 3. When the slide 52 and ball screw 58 returns to the position shown in FIG. 1, the limit switches LS-8 and LS-9 are closed to close the contacts LS-8a and LS-9a and the cycle is repeated.

If flat rings of the type illustrated in FIG. 5a are to be machined, the operation is generally similar except that the drum D is not oscillated about the axis of the shaft 97. The switch 113 is not actuated so that the contacts 113a, 113b and 113c remain open, however, the switch contacts 117b are closed so that the pusher cylinder advance solenoid 66a is energized when the guillotine blade 34 is raised by the actuation of the solenoid 38b.

Since it is obvious that many changes and modifications can be made in the machine described without departing from the nature and spirit of the invention, it is to be understood that the invention is defined in the appended claims.

I claim:

1. A method of machining ringshaped workpieces to provide an axially curvilinear machined outer peripheral surface thereon comprising:
   feeding said ring-shaped workpieces along the longitudinal axis of and through a machining mechanism mounting abrading members;
   relatively rotating said machining mechanism and workpiece as the workpiece is fed through the machining mechanism; and
   oscillating one of said ring-shaped workpieces and said machining mechanism about an axis extending angularly to said longitudinal axis when the workpiece is passing through said machining mechanism to machine reduced external diameter end portions in said workpiece.

2. A method of machining a ring-shaped workpiece comprising:
   moving a workpiece along the axis of and through a tubular machining mechanism mounting abrading members, forming a machining station and frictionally engaging the outer peripheral surface of said workpiece with said abrading members to machine the outer peripheral surface of said workpiece;
   relatively rotating said machining mechanism and said workpiece when said workpiece is axially passing through said machining station;
   oscillating one of said machining mechanism and said workpiece about an axis extending angularly to the axis of the machining mechanism when said workpiece is passing through said machining station to machine reduced diameter end portions in the workpiece; and
   discharging the machined workpiece on the downstream side of said machining station.

3. The method as set forth in claim 2 including individually stripping workpieces from a stack of workpieces as an initial step prior to moving the workpiece through said machining station.

4. The method as set forth in claim 3 wherein the stripping step is accomplished by passing a guillotine member transversely of the stack to remove an endmost workpiece while biasing the remainder of the stack toward said guillotine member.

5. A method of machining the outer peripheral surface of expansible and contractible ring-shaped workpieces having a gap therein comprising:
   moving a positioning fin axially into the gap of a workpiece;
   moving the workpiece toward one side of an abrading mechanism mounting abrading members forming an abrading station while simultaneously constricting said workpiece to close said gap around said fin without relatively rotating said workpiece and said abrading mechanism; and
   moving said workpiece through said abrading station to abrade the outer peripheral surface thereof.

6. The method of claim 5 including the step of gradually expanding the workpieces on the opposite side of said abrading station.

7. A method of machining ring-shaped workpieces having gaps therein, comprising the steps of:
   inserting at least a portion of workpiece holding and positioning means in the gap of a workpiece and axially moving said workpiece holding and positioning means to move a workpiece along the axis of and through a tubular machining mechanism, mounting abrading members at a machining station, from one side of said machining station through said machining station to frictionally engage the outer peripheral surface of said workpiece with said abrading members;
   relatively rotating said machining mechanism and said workpiece holding and positioning means about the machining axis when said workpiece is axially passing through said machining station; and
   discharging the workpiece on the opposite side of said machining station.

8. The method set forth in claim 7 wherein said step of relatively rotating said holding and positioning means and said machining mechanism includes rotating said holding and positioning means in one direction and rotating said machining mechanism in an opposite direction.

9. The method as set forth in claim 7 including oscillating said machining mechanism about an axis extending angularly to the machining axis of said machining mechanism when said machining mechanism and said holding and positioning means are being relatively reciprocated and rotated to machine a workpiece.

10. The method as set forth in claim 7 wherein said holding and positioning means includes a positioning fin movable from a remote position to a gap entering position to hold said workpiece and prevent it from rotating relative thereto; and including the steps of constricting said workpiece prior to the machining of said workpiece, and relatively axially moving said positioning fin and said constricting means to radially contract a workpiece and close said gap around said positioning fin.

11. A method of machining ring-shaped workpieces each having a gap therein comprising:

axially moving a positioning fin into the gap of said workpiece and axially feeding a workpiece through rotatable tubular machining means forming a machining station for receiving and machining the radially outer peripheral surface of a workpiece;

axially moving said feeding means toward and away from said machining means;

rotating said tubular machining means in one direction; and rotating said feeding means in an opposite direction.

* * * * *